United States Patent [19]
Gotoh et al.

[11] Patent Number: 5,484,174
[45] Date of Patent: Jan. 16, 1996

[54] PIPE COUPLING AND METHOD OF JOINING MATERIALS

[75] Inventors: Taiji Gotoh; Hidetoshi Yamamoto, both of Kuwana; Kiyokazu Iwama, Mie; Kiyoshi Yamada, Kuwana, all of Japan

[73] Assignee: Mie Horo Co., Ltd., Mie, Japan

[21] Appl. No.: 465,208

[22] PCT Filed: Jul. 3, 1989

[86] PCT No.: PCT/JP89/00667

§ 371 Date: Jun. 3, 1994

§ 102(e) Date: Jun. 3, 1994

[87] PCT Pub. No.: WO90/00697

PCT Pub. Date: Jan. 25, 1990

[30] Foreign Application Priority Data

Jul. 13, 1988 [JP] Japan .................................. 63-174393

[51] Int. Cl.⁶ ..................................................... F16L 13/14
[52] U.S. Cl. .......................... 285/382.2; 29/508; 285/382
[58] Field of Search ................................. 285/382, 382.2; 29/508; 72/417

[56] References Cited

U.S. PATENT DOCUMENTS

| | | | |
|---|---|---|---|
| 3,596,939 | 8/1971 | Gibson | 285/382.2 |
| 4,880,260 | 11/1989 | Gotoh et al. | 285/382.2 |
| 5,007,667 | 4/1991 | Unewisse | 285/382.2 |

FOREIGN PATENT DOCUMENTS

| | | | |
|---|---|---|---|
| 343395 | 11/1989 | European Pat. Off. | 285/382.2 |
| 2725280 | 12/1978 | Germany | 285/382.2 |
| 53-39873 | 10/1978 | Japan . | |
| 59-90785 | 7/1980 | Japan . | |
| 55-88939 | 7/1980 | Japan . | |
| 56-9027 | 1/1981 | Japan . | |
| 56-6739 | 1/1981 | Japan . | |
| 56-77085 | 6/1981 | Japan . | |
| 59-86784 | 5/1984 | Japan . | |
| 59-150628 | 8/1984 | Japan . | |
| 59-33449 | 8/1984 | Japan . | |
| 59-171070 | 11/1984 | Japan . | |
| 61-1790 | 1/1986 | Japan . | |

OTHER PUBLICATIONS

An extract of Handbook of Piping, Published by Kagakukogyosha Co., Ltd., Japan, Annex 5, pp. 1232–1234.

An extract of Handbook of Anti–Corrosion Technique, Published by Nikkankogyo Shinbunsha, Japan, Annex 4, pp. 36–41.

Primary Examiner—Eric K. Nicholson
Attorney, Agent, or Firm—Frishauf, Holtz, Goodman, Langer & Chick

[57] ABSTRACT

Pipe fittings for joining piping materials have a main body with a substantially equal diameter to that of the piping materials to be joined, an annular expanded portion formed at least at one end portion thereof and enlarged diameter portions on each side of the annular expanded portion. The piping materials are joined by inserting them into the pipe fittings and by pressing the outer enlarged diameter portion along the circumference at an end portion thereof to subject the enlarged diameter portion and the piping materials to plastic deformation. By virtue of recesses formed at the pressed portions, the pipe fittings and the piping materials are firmly fixed together. A tapered portion provided at the end of the pipe fittings effectively increases the slip-off checking force, and also the Joint can be perfectly sealed by the sealing material received in the internal space of the annular expanded portion, having been deformed by the application of pressing. Crevice corrosion can completely be prevented since an adequate clearance is defined between the non-pressed enlarged diameter portion and the piping materials inserted into the pipe fittings.

17 Claims, 3 Drawing Sheets

5,484,174

PIPE COUPLING AND METHOD OF JOINING MATERIALS

TECHNICAL FIELD

This invention relates to thin pipe fittings for joining mutually thin stainless steel pipes and the like and a method of joining piping materials using said pipe fittings.

BACKGROUND ART

As a method of joining mutually thin stainless steel pipes and the like, known is a method, as disclosed in Japanese Patent Publication No. 33449/1984 now Japanese Patent No. 1453790, in which a pipe having been processed to have a reduced diameter at an end portion is inserted into a pipe fitting, and then a circumferential surface of the pipe fitting is allowed to undergo plastic deformation using a compressing tool. However, this method suffers problems that it requires an increased number of processing steps since the end portion of the pipe to be joined must be processed to have a reduced diameter at the job site and that a sectional area of the flow path is slightly reduced at the reduced diameter portion to increase flow resistance consequently.

In Japanese Provisional Patent Publication No. 88939/1980 or Japanese Patent Publication No. 39873/1978, there is disclosed a method in which a pipe is directly inserted to an end of a pipe fitting, and a joint is subjected to deformation using a compressing tool to achieve joining of pipes. However, this method suffers a problem that a circumferential surface of the end portion of the pipe which is brought into contact with a liquid flowing therethrough is in close contact with an internal surface of the pipe fitting to cause a phenomenon of crevice corrosion at this portion where an occluded corrosion cell is formed and the corrosion proceeds, so that the joint may be corroded in a relatively short period if said pipe is of stainless steel.

DISCLOSURE OF THE INVENTION

This invention has been accomplished for a purpose of overcoming these conventional problems and providing pipe fittings which allows secured joining of pipes or pipe fittings (hereinafter simply referred to as piping materials) without applying any diameter reducing process to an end portion of the piping materials to be joined thereby and free from a fear of crevice corrosion and also to provide a method of joining the piping materials using the same.

This invention characteristically employs the pipe fittings having an annular expanded portion and a first enlarged diameter portion both formed at least at one end portion of its main body having a substantially equal diameter to that of the piping materials to be joined, and a second enlarged diameter portion which can define a clearance with a circumferential surfaces of the piping materials to be joined, which is of a size large enough to prevent crevice corrosion.

The method of joining the piping materials according to this invention characteristically comprises:

fitting a sealing material in the internal annular space of the annular expanded portion;

inserting the piping materials to be joined into the pipe fittings until the end of said piping materials reach the second enlarged diameter portion;

pressing a circumference of the pipe fittings with a compressing tool which press the annular expanded portion of the pipe fittings at least at a maximum diameter portion and partially at the first enlarged diameter portion, but not at the second enlarged diameter portion to press the sealing material to achieve sealing between the pipe fittings and the piping materials to be joined; and also forming a plurality of recesses which bite in the piping materials to be joined along the circumference of the first enlarged diameter portion.

BEST MODE FOR CARRYING OUT THE INVENTION

This invention will be described below in more detail referring to the illustrated embodiments.

Figure 1:
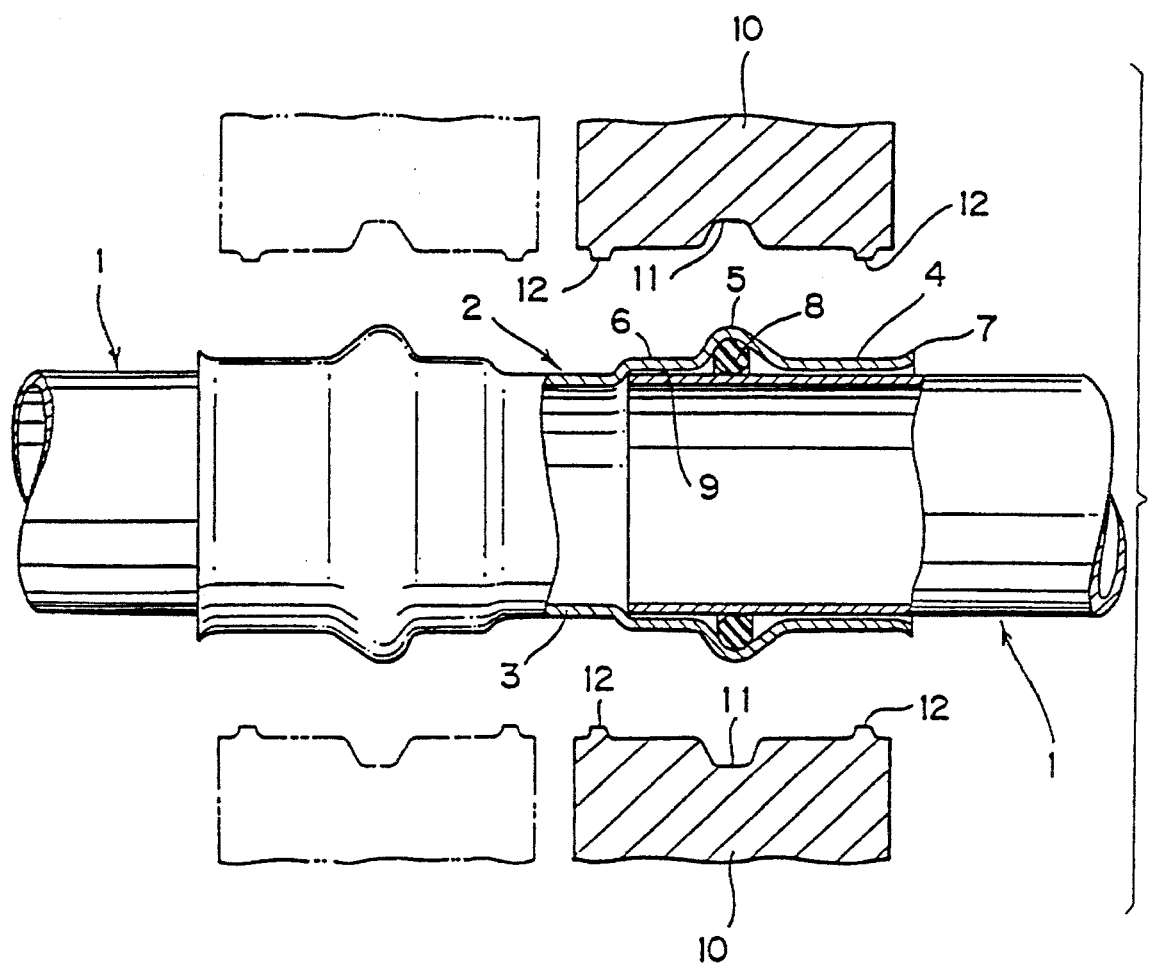
FIG. 1 and FIG. 2 are side elevational views, partially in section, showing a joint construction in accordance with features of this invention.

In FIG. 1, the reference numeral (1) show pipes to be joined; and (2) a pipe fitting, both of which are made of thin stainless steel pipes. The pipe fitting (2) has first enlarged diameter portions (4), annular expanded portions (5) and second enlarged portions (6) formed in this order at both end portions of its main body (3) having substantially equal diameter to that of the pipes (1) to be joined. It is preferred that the first enlarged diameter portions (4) have an inner diameter which is large enough to receive the pipes (1) therein and also have cross-sectionally tapered portions (7) at end portions with a degree of taper such that an annual entrance clearance formed between an internal surface of the first enlarged diameter portions and an external surface of the pipes inserted thereto is substantially equal to a wall thickness of the pipe fitting, whereby to facilitate smooth insertion of the pipes (1), and further that each end portions of the pipe fittings (2) have an increased modulus of section, since the end portions of the pipe fittings (2) are prevented from deformation, in combination with the plurality of recesses formed thereon to bite in the pipes to be joined, to bring about an increased force of checking slip off of the pipes, if any pulling force should be applied to the joint. The annular expanded portions (5) should be appreciated to have an arcuate cross-section, so that sealing materials (8) such as O-ring can be fitted to the internal annular space defined thereby. The second enlarged diameter portions (6) formed on the other side of the annular expanded portions (5) relative to said first enlarged diameter portions (4) are designed to have a size to allow formation of a clearance (9) of not less than 100 µm with the circumference of the pipes (1) to be joined. The clearance (9) of less than 100 µm may readily cause crevice corrosion as described above. Incidentally, the second enlarged diameter portions (6) are preferably designed to have a length shorter than that of the first expanded diameter portions (4).

Figure 2:
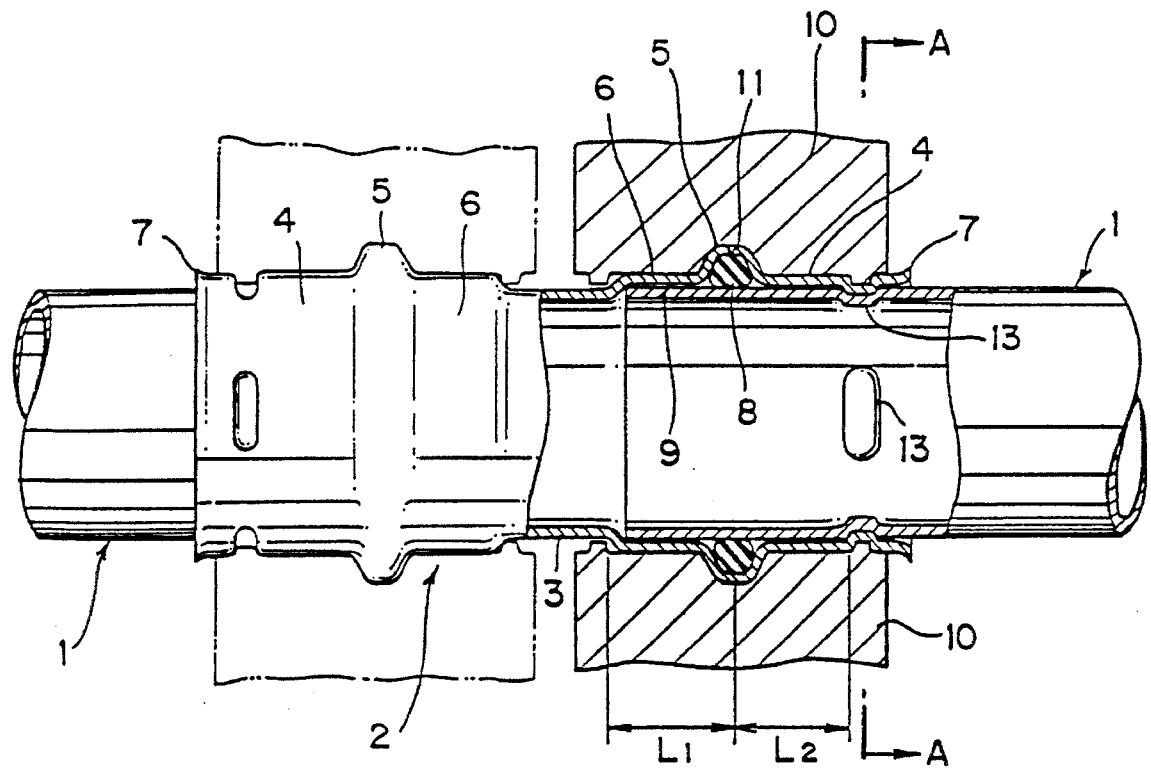
Figure 3:
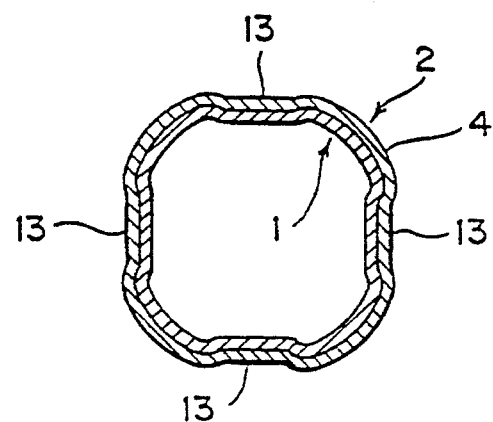
FIG. 3 shows a cross-section of joined piping materials and pipe fittings cut along a plane (a cross-section along the line A—A) at a center of the recessed portions.

In order to achieve joining of piping materials using the present pipe fittings and the method employing the same, the sealing material (8) such as O-ring is first fitted in the internal space of the annular expanded portion (5) of the pipe fitting (2), and then the pipe (1) to be joined is inserted to the pipe fitting (2) until the end of the pipe may reach the distal extremity of the second enlarged diameter portion (6). Next, the circumference of the pipe fitting (2) is pressed by means of compressing tools (10) as shown in FIG. 2. While the compressing tools (10) are each designed to have a groove (11) for pressing the annular expanded portion (5) at least at the maximum diameter portion thereof, and groups of protrusions (12) symmetrically disposed relative to the groove (11), said tools (10) have a shape that one group of protrusions thereof are designed to partially press the area slightly inner than the end of the first enlarged diameter portion (4), whereas the other group of protrusions are designed not to press the circumference of the second enlarged diameter portion (6). By pressing the pipe fitting (2) by use of such compressing tools (10), the crest of the annular expanded portion (5) is crushed to allow tight application of the sealing material (8) disposed to the internal annular space thereof to the circumferential surface of the pipe (1) to achieve secure sealing of the joint, and also a plurality of recesses (13) formed by pressing with the protrusions (12) of the compressing tools (10) at the first enlarged diameter portion (4) along the circumference of the pipe fitting (2), as shown in FIG. 3, bite in the circumference of the pipe (1) to fix the pipe (1) firmly to the pipe fitting (2). Incidentally, the shape of the recesses (13) may suitably be selected, for example, from circular, ellipsoidal, square, rectangular and groove-shaped forms, viewed in radial cross-section, and the number thereof can also be selected suitably.

To demonstrate the effect to be brought about by forming the tapered portion (7) at the distal extremity of the first enlarged diameter portion (4) to increase the section modulus at the end of the pipe fittings (2), for example, the force of checking slip off of the joint using light gauge stainless steel pipes for ordinary piping 13 Su (JIS G 3448), having an outer diameter of 15.88 mm and a wall thickness of 0.8 mm, with no tapered portion at the end thereof showed a slip-off checking force of 298 kgf, whereas the same joint with a tapered portion (7) showed the force of 502 kgf. In the case of the joint using 20 Su pipe, having an outer diameter of 22.22 mm and a wall thickness of 1.0 mm, the force thereof was increased to 739 kgf by forming the tapered portion (7) as opposed to the level of 396 kgf exhibited when the tapered portion (7) is not formed.

In forming recesses (13) on to the circumference of the first enlarged diameter portion (4), it is preferred that the distance (L1) from the annular expanded portion (5) of the pipe fittings (2) to the distal extremity of the second enlarged diameter portion (6) is designed to be equal to the distance (L2) from the annular expanded portion (5) to the proximal extremity of the recesses (13). The reason is that the second enlarged diameter portion (6) must be prevented from being pressed by the compressing tools (10), as shown in FIG. 2 by the solid line, having protrusions (12) formed symmetrically relative to the groove (11) by allowing the groups of idle protrusions provided on one side to be positioned beyond the distal extremity of the second enlarged diameter portion (6). When the counterpart pipe is to be processed likewise, the same compressing tools (10) may preferably be used by sliding them directly to a predetermined position, as shown in FIG. 2 by the dashed line, wherein the group of right side protrusions (12) are likewise positioned beyond the distal extremity (right side in FIG. 2) of the second enlarged diameter portion, whereby the second enlarged diameter portion (6) can be prevented from being pressed.

Figure 4:
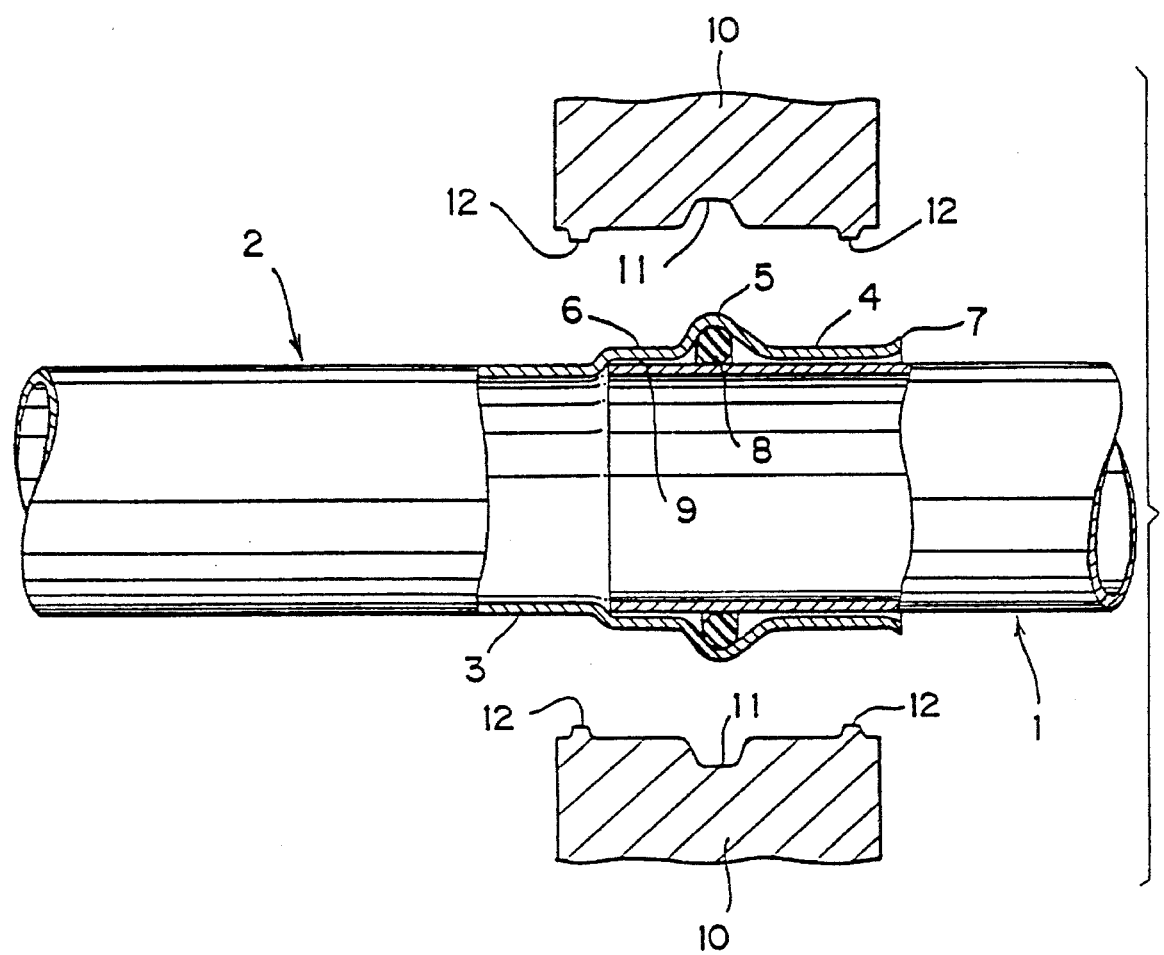
FIG. 4 shows another embodiment of this invention in partially cut away front view.

While the pipe fitting has heretofore been described as having formed first enlarged diameter portions (4), annular expanded portions (5) and second enlarged diameter portions (6) on both longitudinal sides of the main body (3) with the diameter substantially equal to that of the pipes (1) to be joined, the main body (3) may also be a length of pipe itself having a diameter equal to that of the pipes (1) to be joined; or otherwise, as shown in FIG. 4, the main body (3) may correspond to a length of pipe having a diameter equal to that of the pipe (1) to be joined and has a first enlarged diameter portion (4), an annular expanded portion (5) and a second enlarged diameter portion (6) formed at one end of the main body (3). In the latter form of pipe fitting, not only mutually joining of the pipe fittings may be feasible, but also various types of conventional pipe fittings can be used as the piping materials to be joined.

Incidentally, while the pipe fitting has been illustrated as a linear socket, it may be an elbow, a bend, a tee, a lateral, cross, etc.

INDUSTRIAL APPLICABILITY

As can be appreciated from the above description, in the pipe fittings and the method of joining piping materials according to this invention, not only the number of processing steps can be reduced since there is no need of subjecting the end of the pipe to be joined to the diameter reducing processing but also increase in the flow resistance can be prevented which may be caused by the diameter reduction. Further, according to the present pipe fittings and the method of joining piping materials using the same, the piping materials and the pipe fittings are firmly fixed together by virtue of the recesses formed by application of pressing at the first enlarged diameter portion, and also the tapered portion provided at the end of the pipe fittings effectively increases the slip-off checking force, whereby there is no fear of loosening or slip off of piping materials after joining them. Moreover, the sealing material disposed in the internal annular space of the annular expanded portion is deformed by application of pressing and applied tightly to the circumferential surface of the piping materials to achieve perfect sealing of the joint. Still further, according to this invention, since the second enlarged diameter portion of the pipe fittings is not subjected to pressing, the clearance of not less than 100 μm is formed between the internal surface of the pipe fittings and the external surface of the piping materials, whereby crevice corrosion which might otherwise be caused can perfectly be prevented since there is no fear of occluded corrosion cell formation.

Therefore, this invention, having completely overcome the conventional problems, can be deemed to have high practical values.

We claim:

1. A pipe fitting for joining together piping material, the pipe fitting (2) comprising:

a substantially cylindrical main body portion (3) having an inner diameter which is substantially the same as an inner diameter of said piping material (1) to be joined;

first and second cylindrical portions (4, 6) extending from said main body portion (3) in a given direction, said first and second portions (4, 6) each having an inner diameter larger than that of said main body portion (3), said second portion (6) being joined to said main body portion (3) at a distal end of said second portion (6);

an outwardly extending annular portion (5) defining an annular space for receiving therein a sealing material (8), said annular portion being located between said first and second portions (4, 6) and extending outwardly relative to said first and second portions (4, 6);

said second portion (6) having a clearance (9) of not less than 100 μm between the outer surface of said piping material (1) to be joined and the inner surface of said second portion (6), to prevent crevice corrosion at said inner surface of said second portion (6) and at the outer surface of said piping material (1) to be joined;

and wherein:

said second portion (6) has a length (L1) as measured from said annular portion (5) to the distal end of said second portion (6);

said first portion (4) has a length such that a recess (13) formed therein is at a distance (L2) measured from said annular portion (5), wherein said length (L1) is substantially equal to said distance (L2);

said first portion (4) has a main substantially cylindrical portion and an outwardly tapered annular portion (7) formed at a distal end portion of said first portion (4); and said tapered annular portion (7) has a degree of taper such that an annular entrance clearance is formed between an internal surface of the distal end of the tapered portion (7) and an external surface of the piping material (1) to be joined; and said annular entrance clearance is substantially equal to a wall thickness of the pipe fitting.

2. The pipe fitting according to claim 1, comprising a sealing material received in said annular portion (5), said sealing material (8) comprising a ring-shaped sealing member.

3. The pipe fitting according to claim 1, wherein said recesses extend into said piping material (1) to be joined, and form depressions in an inner wall surface portion of said piping material (1) to be joined.

4. The pipe fitting according to claim 1, further comprising additional first and second cylindrical portions (4, 6) extending from said main body portion (3) in a direction other than said given direction, said additional first and second portions (4, 6) each having an inner diameter larger than that of said main body portion, said additional second portion (6) being joined to said main body portion (3) at a distal end of said additional second portion (6);

an additional outwardly extending annular portion (5) defining an annular space for receiving therein a further sealing material (8), said additional annular portion (5) being located between said additional first and additional second portions and extending outwardly relative to said additional first and second portions;

said additional second portion (6) having an additional clearance (9) of not less than 100 µm between the outer surface of said piping material (1) to be joined and the inner surface of said additional second portion (6), to prevent crevice corrosion at said inner surface of said additional second portion (6) and at the outer surface of said piping material (1) to be joined;

and wherein:

said additional second portion has a length (L1) as measured from said further annular portion (5) to the distal end of said additional second portion (6); and said additional first portion (4) has a length such that an additional recess formed therein is at a distance (L2) measured from said additional annular portion (5), wherein said length (L1) is substantially equal to said distance (L2);

said additional first portion (4) has a main substantially cylindrical portion and an outwardly tapered annular portion formed at a distal end portion of said main portion of said additional first portion (4); and said tapered annular portion (7) of said additional first portion (4) has a degree of taper such that an annular entrance clearance is formed between an internal surface of the distal end of the tapered portion (7) of said additional first portion (4) and an external surface of the piping material (1) to be joined; and said annular entrance clearance of said additional first portion (4) is substantially equal to a wall thickness of the pipe fitting.

5. The pipe fitting according to claim 4, comprising a sealing material received in said further annular portion (5), said sealing material (8) of said further annular portion (5) comprising a ring-shaped sealing member.

6. The pipe fitting according to claim 4, wherein said recesses extend into said piping material (1) to be joined, and form depressions in an inner wall surface portion of said piping material (1) to be joined.

7. A combination of a piping material and a pipe fitting for joining to the piping material, the combination comprising:

an elongated cylindrical piping material (1) and a pipe fitting (2) comprising:

a substantially cylindrical main body portion (3) having an inner diameter which is substantially the same as an inner diameter of said piping material (1);

first and second cylindrical portions (4, 6) extending from said main body portion (3) in a given direction, said first and second portions (4, 6) each having an inner diameter larger than that of said main body portion (3), said second portion (6) being joined to said main body portion (3) at a distal end of said second portion (6);

an outwardly extending annular portion (5) defining an annular space for receiving therein a sealing material (8), said annular portion being located between said first and second portions (4, 6) and extending outwardly relative to said first and second portions (4, 6);

said second portion (6) having a clearance (9) of not less than 100 µm between an outer surface of said piping material (1) to be joined and the inner surface of said second portion (6), to prevent crevice corrosion at said inner surface of said second portion (6) and at the outer surface of said piping material (1);

and wherein:

said second portion (6) has a length (L1) as measured from said annular portion (5) to the distal end of said second portion (6);

said first portion (4) has a length such that a recess (13) formed therein is at a distance (L2) measured from said annular portion (5), wherein said length (L1) is substantially equal to said distance (L2);

said first portion (4) has a main substantially cylindrical portion and an outwardly tapered annular portion (7) formed at a distal end portion of said first portion; and said tapered annular portion (7) has a degree of taper such that an annular entrance clearance is formed between an internal surface of the distal end of the tapered portion (7) and an external surface of the piping material (1) to be joined; and said annular entrance clearance is substantially equal to a wall thickness of the pipe fitting.

8. The combination of claim 7, comprising a sealing material received in said annular portion (5), said sealing material (8) comprising a ring-shaped sealing member.

9. The combination of claim 7, wherein said elongated cylindrical piping material is a straight piping material having a straight pipe end to be inserted into said pipe fitting, said straight pipe end having no inwardly or outwardly deformed portions thereof.

10. The combination of claim 7, wherein the portion where said second portion (6) joins to said main body portion (3) defines a sloping portion extending between said second portion (6) and said body portion (3), and wherein said piping material has an end which is inserted into said pipe fitting such that said end of said piping material contacts an internal surface of said sloped portion.

11. A method of joining together piping materials, using the pipe fitting according to claim 1, the method comprising:

fitting a sealing material (8) in said annular space of said annular portion (5);

inserting a piping material (1) into said pipe fitting (2) through said first portion (4) which has a main substantially cylindrical portion and an outwardly tapered annular portion (7) formed at a distal end portion of said main portion, by inserting said piping material (1) into said pipe fitting (2) through said outwardly tapered annular (7) until an end of said piping material (1) reaches an end surface at said distal end of said second portion (6), said piping material (1) having an outer diameter which is not less than 100 μm smaller than the inner surface of said second portion (6) so as to provide a clearance (9) therebetween not less than 100 μm;

pressing a compressing tool (10) on said pipe fitting (2) to compress the annular outwardly extending portion (5) at least at a maximum diameter portion thereof to compress the sealing material (8) between the pipe fitting and the piping material (1), and to compress a portion of said first portion (4) at said distance (L2) from said annular portion (5) to form a plurality of recesses (13) along a circumference of said first portion (4), which recesses (13) extend inwardly into the piping material (1) to lock the piping material (1) to the piping fitting, and wherein said pressing is conducted so as to maintain said clearance (9) of not less than 100 μm between the inner surface of said second portion and the facing outer surface of said piping material.

12. The method of claim 11, wherein said step of fitting a sealing material in said annular space comprises fitting a ring-shaped sealing member into said annular space of said annular portion (5).

13. The method of claim 11, wherein said end surface at said distal end of said second portion (6) comprises a sloping portion, and wherein said piping material (1) is inserted into said pipe fitting (2) until said end of such piping material (1) reaches said sloping end surface of said second portion (6).

14. The method of claim 11, wherein said pipe fitting comprises an end portion of a piping material to be joined to another piping material.

15. The method of claim 11, wherein said fitting comprises further first and second cylindrical portions and a further outwardly extending annular portion arranged as said first-mentioned first and second cylindrical portions and annular portion, and comprising inserting a further piping material into said further first and second cylindrical portions and said outwardly extending annular portion, and pressing a compressing tool on said further first and second portions and said further outwardly extending annular portion to compress a sealing material in said further outwardly extending annular portion against said further piping material.

16. The method of claim 11, wherein said step of inserting a piping material comprises inserting a substantially straight piping material having a straight end portion which has no inwardly or outwardly deformed portions thereof into said pipe fitting (2).

17. The method of claim 12, wherein said step of inserting a piping material comprises inserting a substantially straight piping material having a straight end portion which has no inwardly or outwardly deformed portions thereof into said pipe fitting (2).

\* \* \* \* \*